Patented Oct. 22, 1935

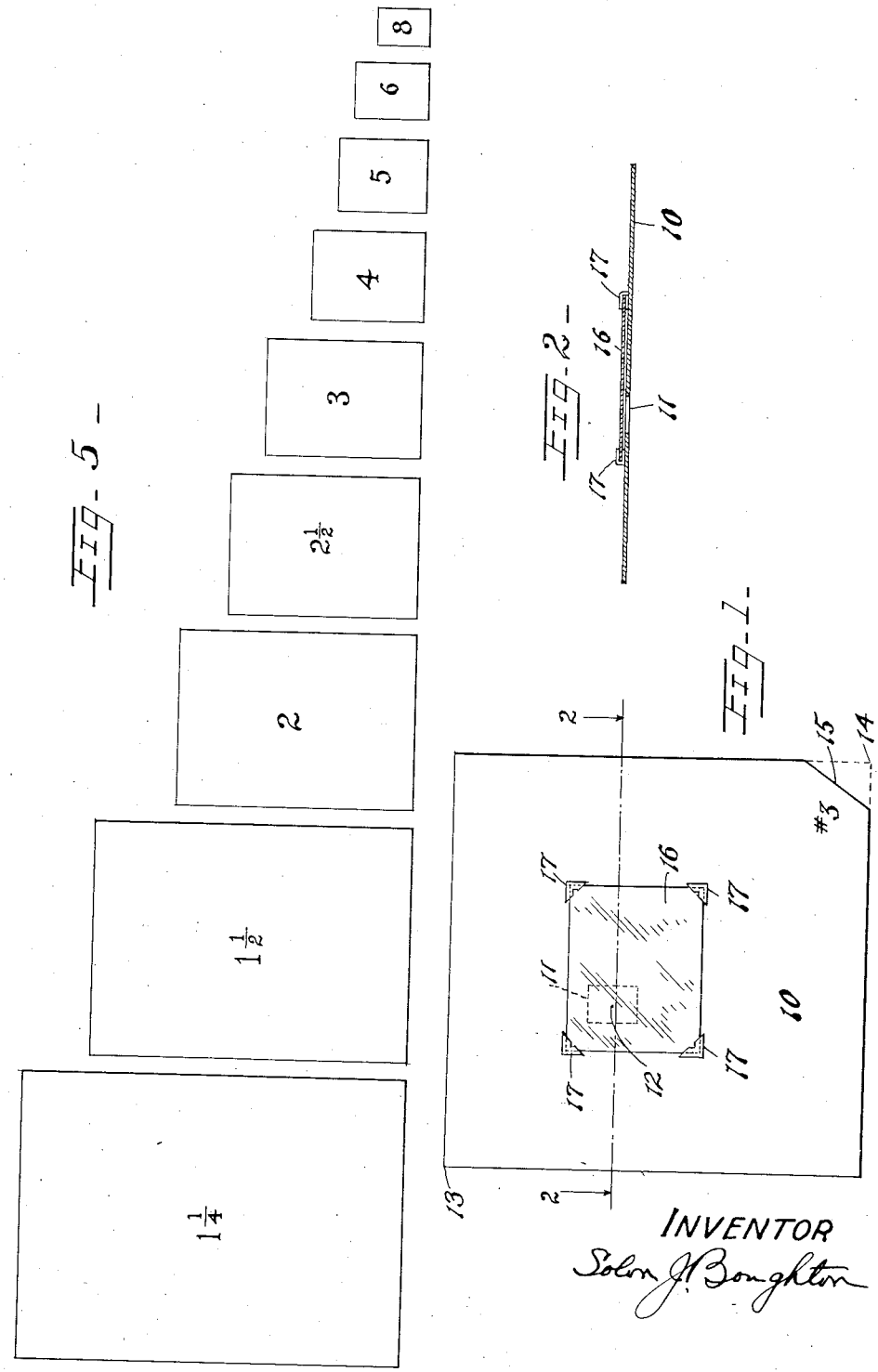

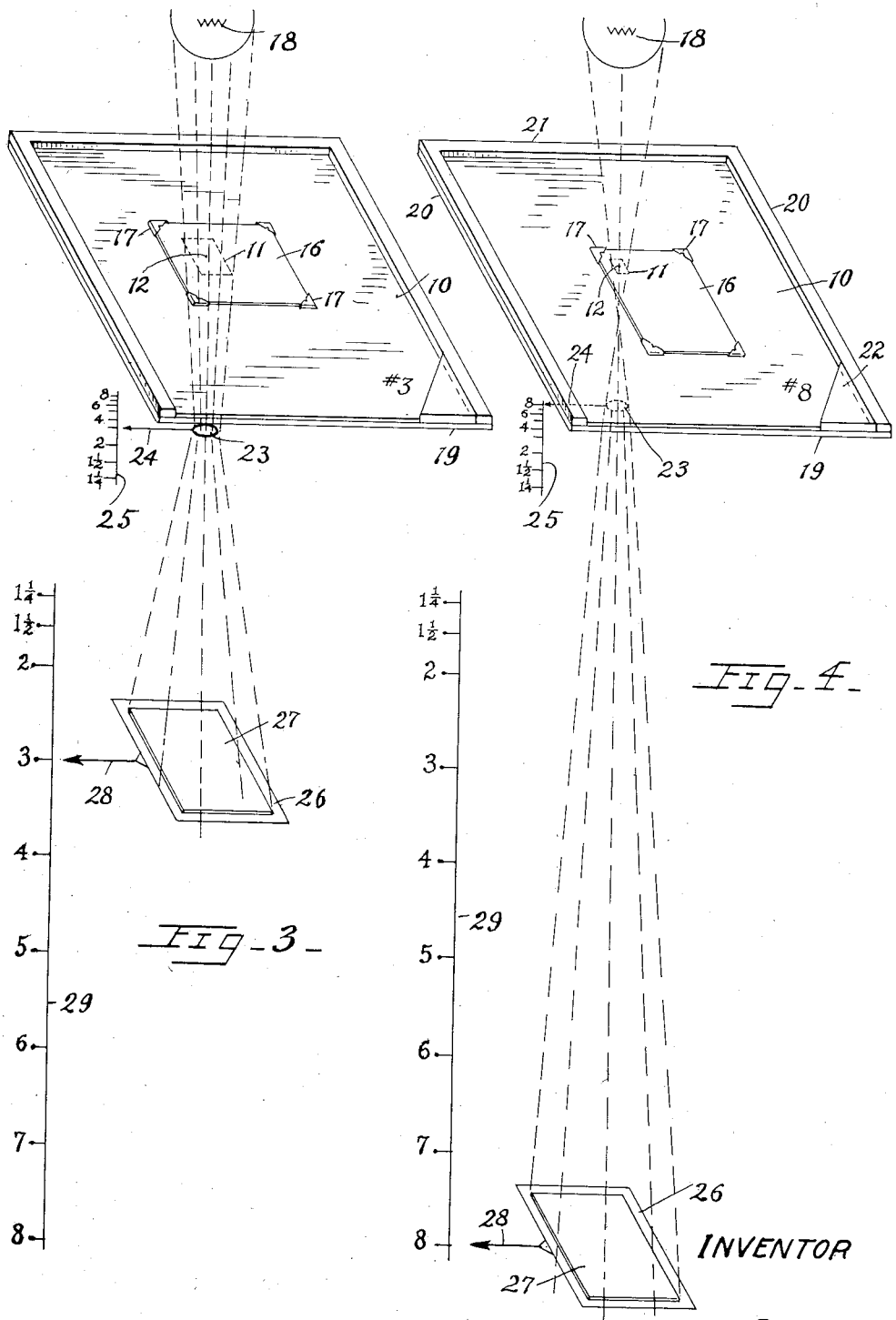

2,018,542

UNITED STATES PATENT OFFICE 2,018,542

APPARATUS AND METHOD FOR MAKING PROJECTION PRINTS

Solon J. Boughton, Shaker Heights, Ohio

Application November 19, 1932, Serial No. 643,495

7 Claims. (Cl. 88—24)

This invention relates to improvements in apparatus and method for making projection prints, embodying photographic masks in sets or series adapted for use in preparing negatives for the making of enlarged prints from selected portions of the negatives. The invention also relates to projection apparatus used in connection with such masks, and to the method of preparing the negatives and using them to produce prints of uniform size and shape from negative areas of the same shape but of different sizes.

In accordance with the invention, I provide a set of masks of uniform shape and size having picture windows therein of different sizes, but all of the same width-height ratio, and in each case a known fraction of the size of the projection print, all of the windows in the various masks being similarly positioned about a common center, in order that projection prints of a given size may be made by the use of a suitably designed enlarger with a minimum of time and effort by merely placing the negative with its mask in the machine, setting the enlarger to correspond with the index number on the mask, and making the exposure.

The procurement, by amateur photographers or "snap shooters", of enlarged prints from selected portions of photographic negatives has heretofore been surrounded with difficulties and relatively heavy expense, and has frequently resulted in disappointment owing to the failure of the photo finisher to carry out precisely the wishes of his customer. Most amateurs are not inclined to assume the expense of enlarging equipment from which to make their own enlargements, and furthermore they would generally not be inclined to make their own enlargements any more than they are now inclined to make their own contact prints. There is a comparatively untouched market for enlargements of moderate size from small negatives and from small bits of negatives of larger size, provided the enlargements are furnished at small cost. Small cost prints are out of the question however with the methods heretofore in vogue, because highly skilled labor is required and because considerable time must be expended on each enlargement in selecting a mask of the correct size and proportions, in arranging the negative and its mask in the negative holder, in projecting the image upon the easel tentatively, making adjustments to bring the image to the desired size (assuming automatic focusing), placing the paper upon the easel so as to have the image centered thereupon, and making the exposure.

In accordance with the present invention the operator making the enlargement is relieved entirely of selecting the mask and arranging the negative with respect thereto. Incidentally, the customer has no one but himself to blame if the resulting print includes anything beyond what it was his intention to include or omits anything which he desired to have included. The operator also has no preliminary work to do with respect to arranging the bromide or other printing paper. He merely places the paper in a paper holder similar to a printing frame, places the holder on the easel or carrier arranged to receive and center it in line with the axis of the lens and center of the mask window. makes a setting of the enlarging apparatus indicated by the index number on the mask, and exposes. None of the work of preparation requires skill. The timing of the exposure requires some experience and judgment, but the computation of the exposure time is greatly simplified by the fact that a limited number of degrees of enlargement are dealt with, corresponding in number with the number of different sized mask windows, the degrees of enlargement varying preferably by regular intervals. Hence tables of exposures may be made up readily, showing the exposure time for each different mask for dense, medium and thin negatives. The use of such exposure tables being the only detail of the method which is at all difficult to master, relatively unskilled labor may be employed with satisfactory results. Furthermore, expensive automatic focusing machines need not necessarily be employed, as the operator may make the double adjustment needed for both easel and lens with only a small amount of extra effort, for all positions of both of these elements may be plainly marked upon the enlarging apparatus to correspond with the marks on the masks.

One of the objects of the invention is the provision of means for preparing a negative for the making of an enlargement of a selected portion thereof, whereby the negative is held definitely in the desired position with respect to the picture window of the mask, and may be handled and transported as much as may be necessary or desirable without becoming disarranged.

Another object is the provision of masks in sets with different sized windows, enabling the owner of negatives to mount them upon selected masks, thereby blocking out all but the desired picture portions of the negatives, and then to take his negatives so mounted to a photo finisher for the production of the projection prints.

Other objects and features of novelty will appear as I proceed with the description of that embodiment of the invention, which for the purposes of the present application, I have illustrated in the accompanying drawings, in which Figure 1 is a plan view of a mask made in accordance with the invention, a negative being mounted thereon.

Fig. 2 is a sectional view taken substantially on the line 2—2 of Fig. 1.

Figs. 3 and 4 are diagrammatic views illustrating the apparatus and method employed in the making of two prints of the same size from negatives mounted upon masks with different sized windows therein, Fig. 3 showing a setting of the apparatus for the making of a print from a number 3 mask, and Fig. 4 showing the setting for a number 8 mask.

Fig. 5 is a diagrammatic view showing the relative sizes of windows in a set of masks made in accordance with the invention, each window being numbered in accordance with the degree of enlargement necessary to project a given size print from the window of that mask. For example, the window of the number 2 mask has linear dimensions one-half those of the desired projection print, and that of the number 8 mask has linear dimensions one-eighth those of the desired print.

In the drawings I have shown a mask 10 which consists of some photographically opaque sheet cut to accurate dimensions. A photographically transparent window 11 is formed in the sheet 10. This window may be formed by cutting though the sheet 10, although it is to be noted that it may be formed in other ways also, as by treating the desired window area chemically or otherwise to render it photographically transparent, or by making the entire mask of a transparent sheet and constituting all portions thereof outside the window area photographically opaque, as by painting or printing on such surrounding portions of the mask. The window 11 is centered about a certain point 12 which is preferably located on a diagonal extending from the corner 13 to the corner 14, but nearer to one of these corners than the other.

I employ a set or series of masks 10, all of the same shape and external dimensions. In the case illustrated there masks are square, except that one corner is removed along the line 15. This corner shape is not an essential feature of the invention, being employed only for the purpose of rendering the shape of the mask irregular, so that it must necessarily go into the mask holder in a predetermined way. Other expedients which will accomplish this result may be used in its place.

The invention contemplates the use of a set or series of masks 10 each having a window 11 therein, the windows of the various masks being all centered in their respective masks about the point 12, and being arranged preferably with their edges parallel to the respective edges of the mask, and having the same width-height ratio, the ratio shown herein being three-to-four. For an example of the windows which may be employed in a set of masks in accordance with the invention, reference may be had to Fig. 5, wherein the rectangles represent the windows of a series of masks, and the numbers at the centers of the windows are the index numbers which would be applied to the corresponding masks. These numbers indicate the degree of enlargement required in the making of projection prints of a given size from negatives framed by the respective windows.

In practice, I make two sizes of projection prints, for example, prints on standard size sheets of 3¼ x 4¼ inches and 6½ x 8½ inches, the picture sizes within the white border being 3 x 4 inches and 6 x 8 inches respectively. The index numbers of the masks represent the degree of enlargement for the 3 x 4 pictures, but as will be obvious the degree of enlargement necessary to make a 6 x 8 picture from any mask is determined simply by multiplying the mask number by two. It will also be observed that there will be a ⅛th inch white border on the 3¼ x 4¼ and a ¼th inch white border on the 6½ x 8½ inch prints. Thus when 6½ x 8½ inch prints are being made, the setting of the projectiong apparatus for a number 1¼ mask would be the same as for a 3¼ x 4¼ print from a number 2½ mask, and similarly when using a number 1½ mask for the larger print the setting would be the same as for the smaller print from a number 3 mask, and the settings for the larger prints from numbers 2, 2½, 3 and 4 masks would be the settings used on the smaller prints for numbers 4, 5, 6 and 8 masks, respectively. It will be noted that six of the nine windows illustrated in Fig. 5 have linear dimensions which are exactly twice the corresponding linear dimensions of other windows of the set, that is to say windows numbered 4, 3, 2½, 2, 1½ and 1¼ have linear dimensions that are twice the corresponding dimensions of windows numbered 8, 6, 5, 4, 3, and 2½ respectively. Hence nine degrees of enlargement serve for 3¼ x 4¼ prints from nine different masks and also for 6½ x 8½ prints from six different masks.

Of course, it will be understood that different sized prints of the same width-height proportions can also be made, as for instance prints having dimensions within the white borders of 9 x 12 inches, when the settings of the projecting apparatus would be three times those for the 3 x 4 pictures. It will also be apparent that sets of masks can be made having windows of other width-height ratios, as for instance 4 x 5, which ratio lends itself readily to the making of 4 x 5 and 8 x 10 prints. However I prefer in practice to employ one standard ratio only, thereby limiting the stock of masks which must be carried by dealers and also avoiding complication in the enlargement apparatus.

In the drawings the negative, which will generally be upon a celluloid film, is indicated at 16. The part thereof which it will be desired to project may be located anywhere upon the negative. The latter is placed upon the mask 10 with the window of the latter framing the desired picture area, and the negative is then mounted upon the mask in such manner as to securely hold it in the desired position. This is done preferably by the use of gummed fasteners 17. These fasteners preferably are of a well known type commonly employed for mounting prints in photographic albums, and comprising pockets which are adapted to receive the corners of the negatives. The adhesive in such case does not touch the negative. It is not essential to employ fasteners of this kind however, because the negative is mounted upon the mask with the emulsion side down, and a gummed sticker can be applied directly to the exposed back of the negative without damaging the emulsion side. In the latter event it may be necessary to clean off the back of the negative after the enlargement is made should it be desired later to make contact prints, and therefore I prefer to use the fasteners herein illustrated or some equivalent.

In practice I employ a mask ten inches square, made of thin cardboard. Such a mask is sufficient to accommodate negatives up to 4 x 5 or 3¼ x 5½ inches for the most extreme positions of those negatives, that is where the picture area used is in any one of the extreme corners. This mask will of course accommodate a considerably larger negative when the picture area is more centrally located.

In Figs. 3 and 4 I have illustrated in a diagrammatic manner the apparatus and method used in making enlarged prints of a given size when masks having two different window sizes are employed. 18 represents any convenient light source. The holder for the mask and negative may consist of a slide having a flat bottom member 19, side rails 20 and an end rail 21. It may also have a triangular block 22 in one corner. The mask 10 fits within this slide with a minimum of clearance, so that the window 11 is accurately positioned in the slide. The slide is in turn accurately positioned in the enlarger, which may be provided with the necessary guides and stop for such purpose. Preferably the enlarger is of the vertical type so that the mask and negative holder are horizontal. For the bottom member 19 of the slide I may use clear glass, and another piece of clear glass, not shown, is preferably placed on top of the negative and mask in order to hold the negative to a true plane. If the bottom member 19 is made of opaque material it must be provided with an opening to register with the mask window of maximum size.

Below the mask and negative holder, and in vertical alignment with the center 12 of the picture window, is the lens 23 of the enlarging camera. This is arranged for vertical adjustment, assuming that the enlarger is of the vertical type, and the lens mounting may carry a pointer 24 running over a gauge 25 upon which are marked the lens positions corresponding with the various degrees of enlargement, and consequently with the various mask members, used in the process.

26 is a paper holder which receives the sheet of projection paper 27 and a piece of clear glass placed upon it. The holder is such that the paper sheet occupies a definite, accurately determined position centered about the vertical line from the point 12 through the axis of the lens 23. The holder is mounted in a vertically movable carrier (not shown), and as it moves up and down, a pointer 28 moves proportionately over a gauge 29 upon which are marked the enlargement numbers corresponding with the numbers on the masks and on the gauge 25. It is to be understood, of course, that the movements described are relative, and that if preferred the paper holder may remain stationary while the mask and negative holder move.

The method is carried out as follows: Assuming that contact prints have been made from a certain group of negatives, and that the owner of the negatives is supplied with at least one set of masks, he then tries various masks over the prints to discover the most desirable picture areas. When he finds something which he desires to have enlarged, he places the corresponding negative upon the selected mask and moves it about until the desired area comes opposite the window in the mask. He then mounts the negative on the mask in that position by means of fasteners 17 or otherwise, and proceeds similarly with the other negatives of the group. By the use of the smaller masks he can frequently pick out close-ups of the head and shoulders of full length figures or select good likenesses of individuals found in group pictures. Frequently it will be necessary to resort to the use of a microscope in order to determine whether or not a particular enlargement will be satisfactory. Also, the process will make it unnecessary for a photographer to carry telephoto lens equipment, because the same result can be obtained by making an exposure with the ordinary lens and then enlarging that portion of the resulting negative which is desired. Similarly, the purchase and use of supplementary lenses, such as portrait attachments, is rendered superfluous for the same reason, and it is to be remembered that better perspective in portraits may be secured by making the exposure with the camera placed at a fair distance from the sitter and thereafter removing undesired portions of the background and enlarging the portrait proper by the use of my invention.

A number of negatives having been mounted upon appropriate masks, as described, the masks are taken to a photo finisher equipped with the proper apparatus, and the enlargements are made. A given mask is placed in the mask holder. The block 22 insures its being arranged correctly in the holder. The latter is then slid into position in the enlarger. The operator notes the index number on the mask and sets the pointers 24 and 28 opposite gauge numbers corresponding to the number on the mask. If the apparatus includes automatic focusing means, but one adjustment will be required instead of two. The operator then puts a piece of paper into the paper holder 26 and makes the exposure. If a double size or triple size print is ordered a paper holder of a different size is substituted for the holder 26 and the pointers 24 and 28 are set opposite numbers corresponding to twice or three times the mask number, as the case may be.

Having thus described my invention, I claim:

1. In combination, a set of masks for use in preparing negatives for the making of projection prints of a given width-height ratio, said masks being of uniform shape and size, each of said masks having a window therein which is a known fraction of the size of the desired print and bears an identifying designation relating to that fraction, and all of said windows being of the same width-height ratio, the windows in the various masks being of different sizes and being centered about the same point, and a projection apparatus adapted to receive said masks, said apparatus being provided with marks corresponding to the marks on said masks and indicating settings of the apparatus necessary for enlarging the various window areas up to the projection area of predetermined size.

2. A method of preparing negatives for the making of projection prints of a given size and a given width-height ratio, which comprises preparing a set of masks of uniform external dimensions, said masks having windows therein centered about the same point, said windows being of different sizes but all of the same width-height ratio as the said prints, marking each mask with an identifying designation relating to the ratio between the size of its window and the size of the said print, selecting for each negative a mask with a window of a size to frame the desired portion of the negative, and mounting the negatives upon the respective masks, whereby the masked negatives may be inserted one at a time into a projection printer, and the settings of the printer made from the said designations upon the respective masks, to produce projection prints of uniform size.

3. In combination, a set of masks for use in preparing negatives for the making of projection prints of a given width-height ratio, said masks being of uniform shape and size, each mask having a window therein which is a known fraction of the size of the desired print and bearing an identifying designation relating to that fraction, and all of said windows being of the same width-height ratio, the windows in the various masks being of different sizes and being centered about the same point, said masks being adapted to cooperate with a special projection printing apparatus provided with a setting gauge having marks corresponding to the marks on said masks and indicating settings of the apparatus necessary for enlarging the various window areas up to the projection area of predetermined size.

4. A method of making projection prints of a given size and a given width-height ratio from negative areas of the same shape but different sizes, which comprises preparing a set of masks of uniform external dimensions, said masks having windows therein centered about the same point, said windows being of different sizes but all of the same width-height ratio as the said prints, marking each mask with an identifying designation relating to the ratio between the size of its window and the size of said print, selecting for each negative a mask with a window of a size to frame the desired portion of the negative, mounting the negatives upon the respective masks, inserting the masked negatives one at a time in a projection printer arranged to center the mask windows with the axis of the printer lens, setting the printer for each negative according to the designation on its mask, mounting a sheet of printing paper for each print in a paper holder arranged to center the paper about the axis of said lens, and making the exposures.

5. Apparatus for making projection prints of uniform shape and size from negative areas of the same shape but of different sizes, which comprises a series of masks of uniform size and shape, having windows therein of the same shape as the projection prints but of different sizes, each mask being marked with an identifying designation relating to the ratio between the size of its window and the size of the said prints, said windows being uniformly centered in the masks, a projection printer, a mask holder adapted to be inserted into the printer in position to bring the window centers of the various masks into axial alignment with the lens of the printer, means for setting the printer for each mask comprising a scale bearing divisions corresponding to the designations on said masks, and a paper holder arranged to center the printing paper about the axis of said lens.

6. Apparatus for making projection prints on sheets of uniform size from negative areas of different sizes, which comprises a series of masks of uniform outer dimensions, a projection printer, a mask holder adapted to accurately center the mask therein and adapted to be inserted into the printer in a definite predetermined position, each mask having a window therein falling within the field of the printer lens, a paper holder adapted to accurately center the paper therein and adapted to be inserted into the printer in a definite established position with the paper centered about the axis of said lens, one of the dimensions of each mask window being a known fraction of a corresponding dimension of the desired print, the windows of the various masks being of different sizes, the window of each mask being so positioned that the negative image projected therethrough will fall wholly within the borders of the printing paper in said paper holder, each mask being marked with an identifying designation relating to the ratio between its said dimension and the corresponding dimension of the print, and means for setting the printer for each mask comprising a scale bearing divisions corresponding to the designations on said masks.

7. In combination, a set of masks for use in preparing negatives for the making of projection prints on sheets of a given size, said masks having uniform external dimensions, each mask having a window therein with one dimension which is a known fraction of the similar dimension of the said projection print, and bearing an identifying mark relating to that fraction, said masks being adapted to cooperate with a special projection printing apparatus having means for accurately positioning the mask and printing paper with respect to the axis of the printer lens and provided with a setting gauge having marks corresponding to the marks on said masks and indicating settings of the apparatus necessary for enlarging various window areas so as to cause each said window dimension to be enlarged to said corresponding print dimension.

SOLON J. BOUGHTON.